United States Patent
Stojkovic et al.

(10) Patent No.: US 9,578,932 B2
(45) Date of Patent: Feb. 28, 2017

(54) VARIABLE RADII FLANGES FOR MECHANICALLY RETAINED CRUSH TUBES

(71) Applicant: Ford Global Technologies, LLC, Dearborn, MI (US)

(72) Inventors: Dragan B. Stojkovic, Taylor, MI (US); Colleen Marie Hoffman, Canton, MI (US); Vince Chimento, Plymouth, MI (US); Matthew Forsyth, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 449 days.

(21) Appl. No.: 14/273,983

(22) Filed: May 9, 2014

(65) Prior Publication Data

US 2015/0320149 A1    Nov. 12, 2015

(51) Int. Cl.
| | | |
|---|---|---|
| *A44B 13/00* | (2006.01) | |
| *F16M 13/02* | (2006.01) | |
| *B21D 39/06* | (2006.01) | |
| *F16B 17/00* | (2006.01) | |

(52) U.S. Cl.
CPC .......... *A44B 13/0076* (2013.01); *B21D 39/06* (2013.01); *F16B 17/004* (2013.01); *F16M 13/02* (2013.01); *Y10T 16/088* (2015.01)

(58) Field of Classification Search
CPC ........ B62D 21/00; B62D 21/02; B62D 21/09; B62D 21/11; B62D 21/12; B62D 27/065; F16B 17/002
See application file for complete search history.

(56) References Cited

U.S. PATENT DOCUMENTS

| | | | | |
|---|---|---|---|---|
| 2,194,349 | A * | 3/1940 | Almdale | B62D 21/02 182/228.1 |
| 2,327,585 | A * | 8/1943 | Ulrich | B62D 21/09 280/797 |
| 3,283,402 | A * | 11/1966 | Larson | B21D 39/063 165/175 |
| 4,613,184 | A * | 9/1986 | Rispeter | B62D 65/04 280/781 |
| 5,259,660 | A * | 11/1993 | Haesters | B62D 25/24 296/204 |
| 5,839,848 | A * | 11/1998 | Sahramaa | B21D 39/032 403/274 |
| 6,406,077 | B2 * | 6/2002 | Johnson | B60R 19/18 293/102 |
| 7,001,097 | B2 * | 2/2006 | Wang | B62D 25/025 296/193.06 |

(Continued)

FOREIGN PATENT DOCUMENTS

| | | |
|---|---|---|
| CN | 202280586 U | 6/2012 |
| JP | 2004154839 | 6/2004 |

*Primary Examiner* — Daniel Wiley
(74) *Attorney, Agent, or Firm* — Jason Rogers; Bejin Bieneman PLC

(57) ABSTRACT

A support assembly for an assembly comprised of an extruded member that defines a cavity, the member including an opening having a plurality of sides, and a crush tube inserted into the cavity of the member and mechanically retained in the member at or near a desired location by flanging the sides of the opening into an open end of the crush tube.

11 Claims, 4 Drawing Sheets

(56) References Cited

U.S. PATENT DOCUMENTS

| | | | |
|---|---|---|---|
| 7,066,533 B2* | 6/2006 | Sohmshetty | B62D 25/082 296/187.09 |
| 7,127,816 B2 | 10/2006 | Kiehl | |
| 7,201,398 B1* | 4/2007 | Christofaro | B62D 21/02 180/312 |
| 7,275,296 B2* | 10/2007 | DiCesare | B21D 39/06 29/463 |
| 7,654,571 B2 | 2/2010 | Gabbianelli et al. | |
| 7,686,387 B2* | 3/2010 | Yustick | F16B 19/02 296/205 |
| 7,771,137 B2* | 8/2010 | Anzai | B62D 21/11 180/232 |
| 8,246,104 B2* | 8/2012 | Ohkubo | B62D 25/2036 296/187.08 |
| 8,292,357 B2* | 10/2012 | Caliskan | B62D 21/02 296/204 |
| 8,484,930 B2* | 7/2013 | Ruehl | B62D 21/00 280/797 |
| 8,905,437 B2* | 12/2014 | Tsuchiya | B62D 21/02 280/124.106 |
| 8,915,530 B2* | 12/2014 | Wagner | B23K 26/28 29/897.2 |
| 9,187,129 B2* | 11/2015 | Stojkovic | B62D 24/04 |
| 9,221,500 B1* | 12/2015 | Courtright | B62D 33/077 |
| 2007/0176406 A1* | 8/2007 | Ruehl | B62D 21/00 280/785 |
| 2009/0188206 A1* | 7/2009 | Stol | B23K 31/027 52/762 |
| 2010/0289300 A1* | 11/2010 | Kokubo | B21D 39/04 296/205 |
| 2012/0161439 A1 | 6/2012 | Rajopadhye | |
| 2013/0026794 A1 | 1/2013 | Wagner et al. | |
| 2016/0107692 A1* | 4/2016 | Carle | B62D 27/065 296/205 |

* cited by examiner

VARIABLE RADII FLANGES FOR MECHANICALLY RETAINED CRUSH TUBES

BACKGROUND

Extruded hollow bars may be used as members in a support assembly. A cavity in a support assembly member may include a crush tube to provide additional support, bear a mechanical load at an attachment point of the member to a support assembly, etc. It is generally desired to retain a crush tube at or near a particular location in the cavity. For example, it may be desired to retain the crush tube at or near an opening in the support member. However, stresses at or near the opening can cause defects such as cracks and the like to form in the member, e.g., when the member is made of extruded aluminum. Such defects may in turn compromise the support assembly.

DRAWINGS

DETAILED DESCRIPTION

Figure 1:
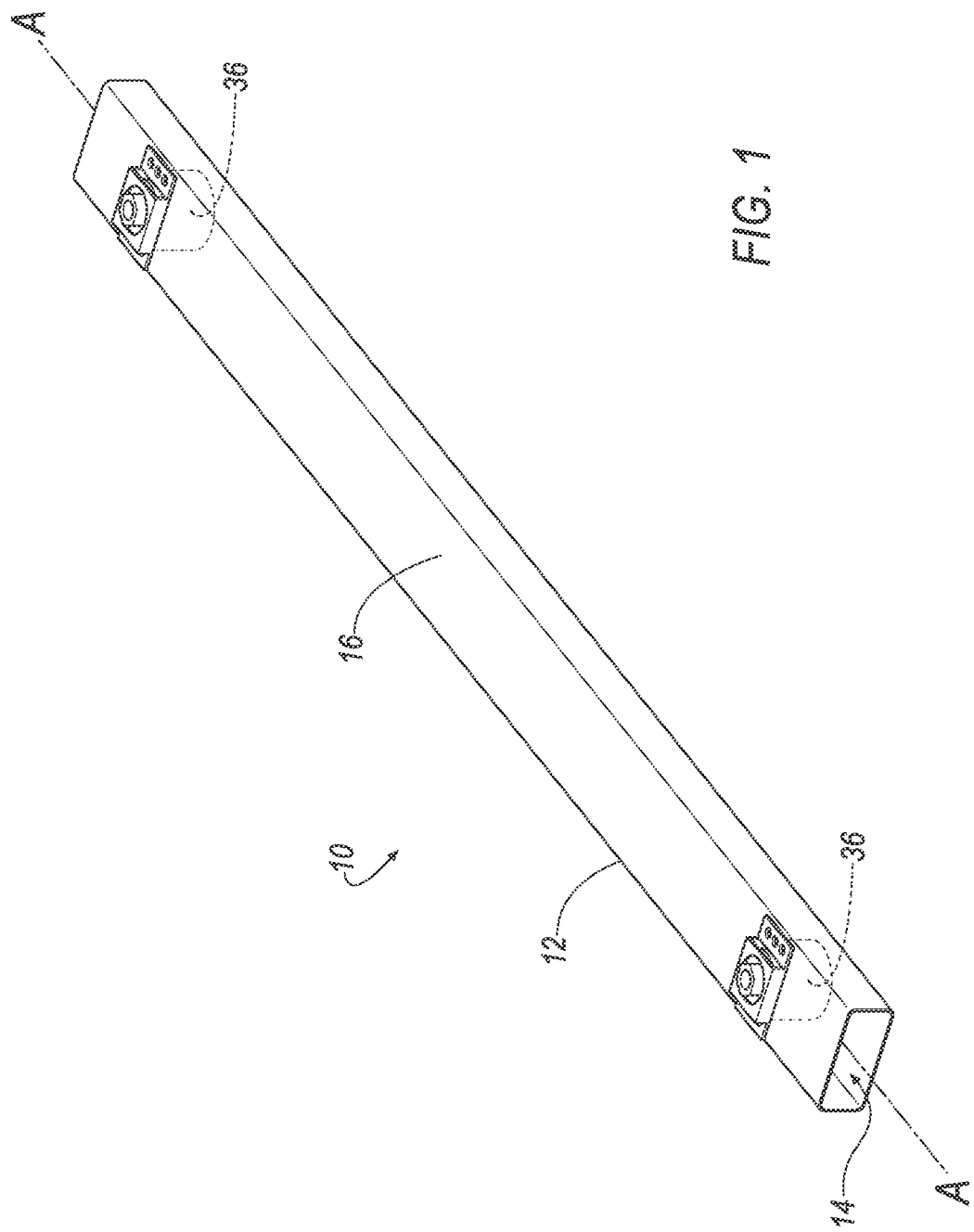
FIG. 1 is a perspective view of an exemplary support assembly.

FIG. 1 is a perspective view of an exemplary support assembly 10. The support assembly 10 includes a member 12 formed by being extruded along a longitudinal axis A. The member 12 defines a cavity 14. The member 12 has a substantially rectangular cross-section, and includes a substantially planar top surface 16. The cavity 14 may accommodate one or more crush tubes 36, e.g., as further shown in FIG. 1, two crush tubes 36 have been inserted into the cavity 14 of the member 12 to provide localized strength and support.

Figure 2:
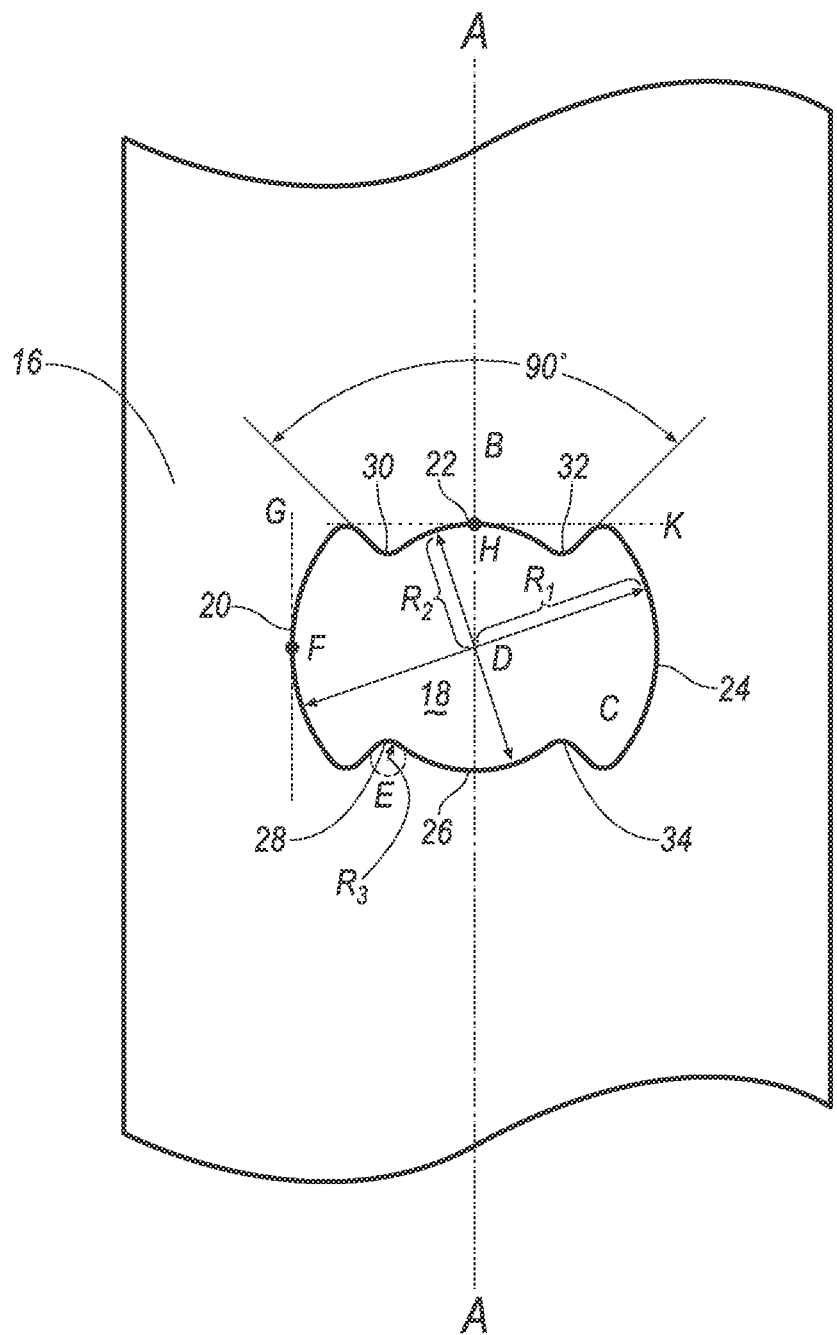
FIG. 2 is a top perspective view of an exemplary top surface of a member showing an exemplary opening.

As seen in FIG. 2, the top surface 16 of the member 12 includes an opening 18 to the cavity 14. The opening 18 includes a plurality of arcuate sides, each side forming an arc defined by a portion of one of a plurality of circles having a center point D. Accordingly, a first side 20 is defined by a first curvature. A point F is substantially midway between endpoints of the side 20. A tangent line G at the point F is substantially parallel to the longitudinal axis A of the member 12. The opening 18 also includes a second side 22 that has a second curvature. A point H is substantially midway between endpoints of the side 22. A tangent line K at the point H is substantially perpendicular to the longitudinal axis A. Further, in the example of FIG. 2, the opening 18 has a third side 24 that diametrically opposes the first side 20 about an axis, and a fourth side 26 that diametrically opposes the second side 22 about an axis.

Still referring to the example of FIG. 2, arcs of a first circle B, define the first side 20 and third side 24 of the opening 18. Arcs of a second circle C define the second side 22 and fourth side 26 of the opening 18. The first circle B and second circle C have a common center point D, with the first circle having a first radius $R_1$, and the second circle having a second radius $R_2$. The two radii $R_1$, $R_2$ differ in length, e.g., as shown in FIG. 2, the first radius $R_1$ is longer than the second radius $R_2$.

In addition, the opening 18 in member 12 includes connecting sides 28, 30, 32 and 34. Fifth side 28, which connects fourth side 26 and first side 20, has a convex curvature relative to fourth side 26 and first side 20. Sixth side 30, seventh side 32 and eighth side 34 connect first side 20 and second side 22, second side 22 and third side 24, and third side 24 and fourth side 26, respectively. Sixth side 30, seventh side 32 and eighth side 34 are likewise convex relative to the sides they connect. Moreover, the fifth side 28, sixth side, 30, seventh side 32 and eighth side 34 of opening 18 have a third curvature, and are defined by arcs of a circle E having a radius $R_3$. In general, the radius $R_3$ is shorter than either of the radii $R_1$, $R_2$, e.g., half a length or less of the other two radii. For example, the radius $R_3$ may have a length defined by the formula:

$$R_3 = (R_1 - R_2)/Z,$$

where $R_2$ is a length of the second radius, $R_1$ is the length of the first radius, and Z is a distance coefficient. A value for Z may be empirically determined. For example, in one embodiment, a value of Z=0.8 has been found to provide a radius $R_3$ whereby cracks and fractures in the member 12 are prevented.

Returning to FIG. 1, the cavity 14 of member 12 may be adapted to allow one or more crush tubes 36 or other suitable elements to be inserted into, fitted through, or otherwise placed in the member 12. The crush tubes 36 provide member 12 with localized stiffness and strength so that the support assembly 10 can better support loads, among other things. In the example of FIG. 1, the crush tubes 36 are inserted into cavity 14 of member 12, and under openings 18. Once a crush tube 36 is positioned with respect to an opening 18, the opening 18 may be subjected to a flanging operation so that the sides 20, 22, 24, 26, 28, 30 and 32 are curved into an open end 38 of the crush tube 36 to mechanically retain the crush tube 36 at or near a desired location of member 12. The open end 38 of the crush tube 36 will generally have a diameter slightly larger than first circle B. Accordingly, as discussed below with respect to FIG. 3B, when the opening 18 is flanged, the sides 20, 22, 24, 26, 28, 30 and 32 of opening 18 of member 12 form flanges in the open end 38 of crush tube 36 that maintain the crush tube at or near the desired location.

Figure 3A:
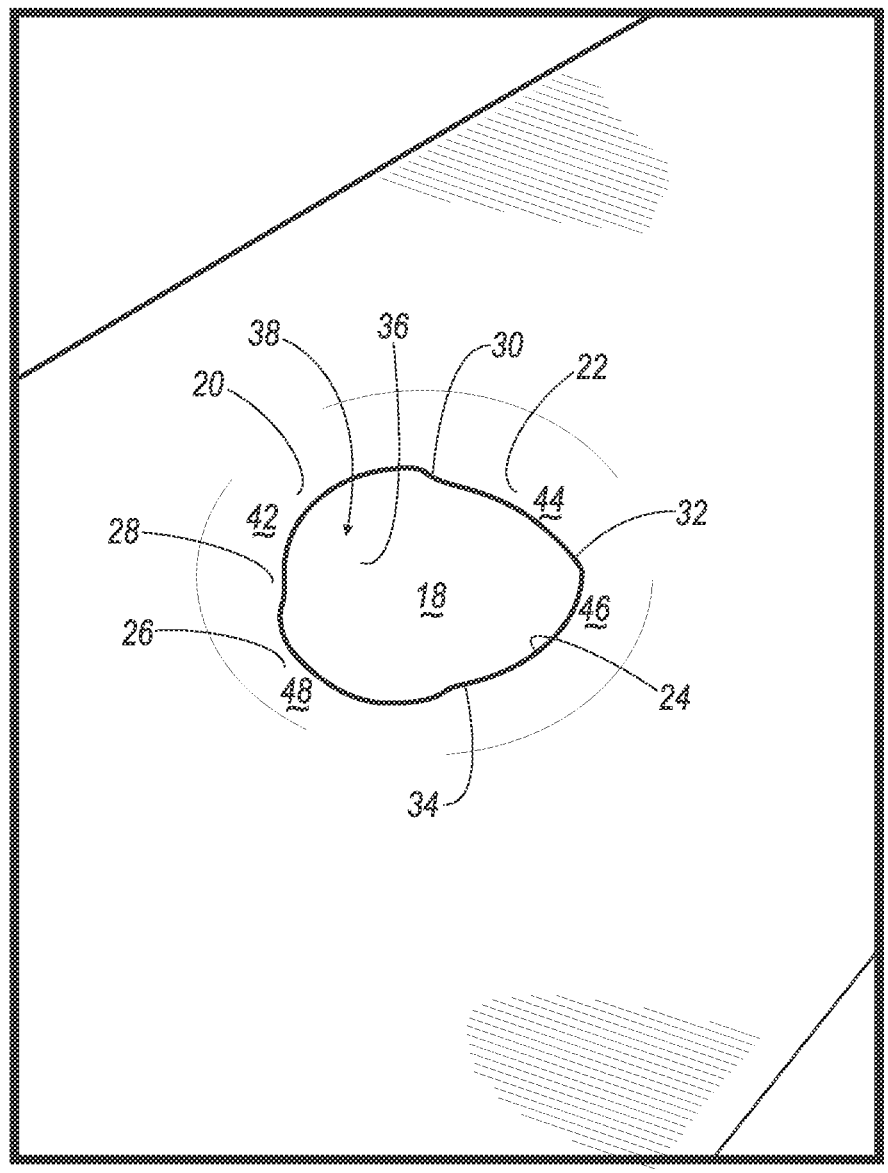
FIG. 3A is a perspective view of an exemplary top surface of a member after the opening in the member has been flanged.

FIG. 3A is a perspective view of the top surface 16 of the member 12 after the opening 18 has been flanged, creating flanges 42, 44, 46, and 48, respectively formed at each of the sides 20, 22, 24, and 26. The flanges 42, 44, 46, and 48 secure the crush tube 36 at or near a desired location in the member 12. As FIG. 3A illustrates, second side 22 of opening 18 extends to a first depth into the open end of crush tube 36, further than a second depth to which the first side 20 extends, whereby the flange 44 has a first curvature that is greater than a second curvature of the flange 42. Similarly, the flange 48, formed at the side 26, extends into the opening 18 at roughly the first depth of the flange 44, and at roughly the first curvature, whereas the flange 46 extends into the opening 18 at roughly the second depth. This difference in flange curvatures and depths is a result of the radius $R_2$ being shorter than the radius $R_1$, as described above.

Figure 3B:
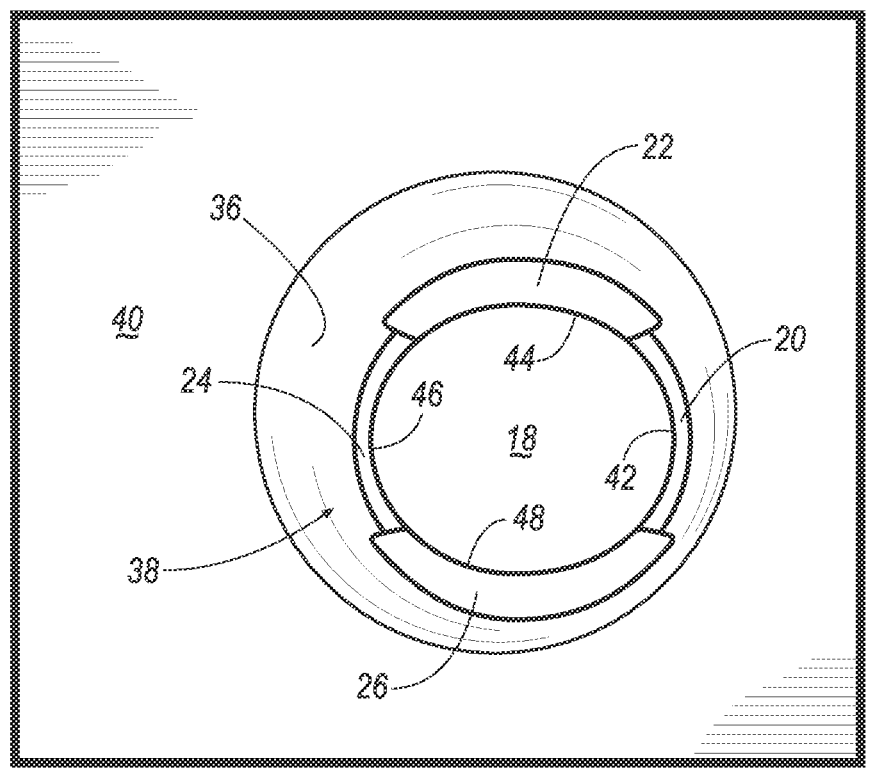
FIG. 3B is a perspective view of exemplary bottom surface of a member.

FIG. 3B is a perspective view of a bottom surface 40 of the member 12. From this view, the open end 38 of crush tube 36 is shown, as are sides 22, 24 and 26 of opening 18. After the flanging operation, the first side 20 forms a first flange 42, the second side 22 forms a second flange 44, the third side 24 forms a third flange 46, and the forth side 26 forms a fourth flange 48, which mechanically retain crush tube 36.

As used herein, the adverb "substantially" modifying an adjective means that a shape or structure may deviate from an exact described geometry because of imperfections in materials, machining, manufacturing, etc.

In the drawings, the same reference numbers indicate the same elements. Further, some or all of these elements could be changed. Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their ordinary meaning as understood by those skilled in the art unless an explicit indication to the contrary is made herein. In particular, use of the singular articles such as "a," "the," "said," etc. should be read to recite one or more of the indicated elements unless a claim recites an explicit limitation to the contrary.

The invention claimed is:

1. A support assembly comprising:
   a member extruded along an axis of extrusion and defining a cavity;
   an opening extending through the member into the cavity, the opening having a first side with a first curvature, and a second side with a second curvature;
   a crush tube having an open end, the crush tube inserted into the cavity with the open end located under the opening;
   wherein when the first and second sides of the opening are deformed into the cavity, the first side forms a first flange in the open end of the crush tube having a first depth, and the second side forms a second flange in the open end of the crush tube having a second depth, and the first depth is less than the second depth.

2. The support assembly of claim 1, wherein the first flange includes a first flange surface having a first curvature and the second flange includes a second flange surface having a second curvature.

3. The support assembly of claim 1, wherein the opening includes an other side having a third curvature.

4. The support assembly of claim 3, wherein the third curvature is convex with respect to each of the first and second curvatures.

5. The support assembly of claim 3, wherein the other side connects the first side and the second side.

6. The support assembly of claim 5, wherein the first and second curvatures are defined by respective first and second radii of first and second circles, the first and second circles having a same center point, and further wherein the third curvature is an arc of a third circle, a length of a radius R3 of the third circle being defined according to the formula $R3=(R1-R2)/Z$, where R2 is a length of the second radius, R1 is a length of the first radius, and Z is a distance coefficient.

7. The support assembly of claim 6, wherein $Z=0.8$.

8. The support assembly of claim 1, wherein the first and second curvatures are defined by respective first and second radii of first and second circles, the first and second circles having a same center point.

9. The support assembly of claim 8, wherein the opening further includes a third side and a fourth side, the third side opposing the first side generally parallel to the axis of extrusion, and the fourth side opposing the second side generally perpendicular to the axis of extrusion.

10. The support assembly of claim 1, wherein the member is composed of aluminum.

11. The support assembly of claim 1, wherein the member has a generally rectangular cross-section.

* * * * *